(12) United States Patent
Kato et al.

(10) Patent No.: US 12,261,424 B2
(45) Date of Patent: Mar. 25, 2025

(54) FIXING STRUCTURE OF WIRING MEMBER AND WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Hirotaka Kato, Mie (JP); Hiroki Hirai, Mie (JP); Makoto Higashikozono, Mie (JP); Kosuke Sone, Mie (JP); Hirokazu Komori, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 273 days.

(21) Appl. No.: 17/635,176

(22) PCT Filed: Aug. 18, 2020

(86) PCT No.: PCT/JP2020/031094
§ 371 (c)(1),
(2) Date: Feb. 14, 2022

(87) PCT Pub. No.: WO2021/039496
PCT Pub. Date: Mar. 4, 2021

(65) Prior Publication Data
US 2022/0294198 A1    Sep. 15, 2022

(30) Foreign Application Priority Data
Aug. 29, 2019  (JP) .................. 2019-156706

(51) Int. Cl.
*H02G 3/04*  (2006.01)
*B60R 16/02*  (2006.01)

(52) U.S. Cl.
CPC ....... *H02G 3/0456* (2013.01); *B60R 16/0215* (2013.01)

(58) Field of Classification Search
CPC ...... B60R 6/0207; B60R 16/0215; H02G 3/04; H02G 3/30; H02G 3/32; H02G 3/325; H01B 7/0045; H01B 7/0846
See application file for complete search history.

(56) References Cited

U.S. PATENT DOCUMENTS

| | | | | |
|---|---|---|---|---|
| 5,642,852 A | * | 7/1997 | Suzuki | B23K 20/10 228/110.1 |
| 2002/0117321 A1 | * | 8/2002 | Beebe | B60R 16/0215 174/72 A |

(Continued)

FOREIGN PATENT DOCUMENTS

| | | |
|---|---|---|
| CN | 104620327 | 5/2015 |
| CN | 104871383 | 8/2015 |

(Continued)

OTHER PUBLICATIONS

China Office Action issued in China Patent Application No. 202080060583.0 dated Jun. 30, 2023, along with an English translation thereof.

(Continued)

*Primary Examiner* — Paresh Paghadal
(74) *Attorney, Agent, or Firm* — GREENBLUM & BERNSTEIN, P.L.C.

(57) ABSTRACT

A fixing structure of a wiring member includes: an electrical wire bundle; an exterior member externally mounted to the electrical wire bundle; and an adherend having a main surface as a flat surface, wherein the exterior member has an outer surface as a flat surface, and the outer surface and the (Continued)

main surface have surface contact with and are bonded to each other while the electrical wire bundle is disposed on the main surface of the adherend.

4 Claims, 3 Drawing Sheets

(56) References Cited

U.S. PATENT DOCUMENTS

| | | | |
|---|---|---|---|
| 2015/0235734 A1 | 8/2015 | Takata et al. | |
| 2015/0321625 A1 | 11/2015 | Sato et al. | |
| 2018/0339667 A1* | 11/2018 | Hiramitsu | B60R 16/0215 |
| 2019/0245333 A1* | 8/2019 | Kawakami | H01B 7/0045 |
| 2020/0172027 A1 | 6/2020 | Mizuno et al. | |

FOREIGN PATENT DOCUMENTS

| | | | | |
|---|---|---|---|---|
| JP | 2000-264137 | | 9/2000 | |
| JP | 2002112440 | A * | 4/2002 | H02G 3/30 |
| JP | 2002-371253 | | 12/2002 | |
| JP | 2010-081760 | | 4/2010 | |
| JP | 2019-3925 | | 1/2019 | |
| WO | 2018/030141 | | 2/2018 | |
| WO | 2018/235788 | | 12/2018 | |

OTHER PUBLICATIONS

International Search Report issued in International Patent Application No. PCT/JP2020/031094, dated Oct. 27, 2020, along with an English translation thereof.

International Preliminary Report on Patentability issued in International Patent Application No. PCT/JP2020/031094, dated Mar. 10, 2022, along with an English translation thereof.

Japan Office Action issued in Japan Patent Application No. 2019-156706 dated Oct. 4, 2022, along with an English translation thereof.

* cited by examiner

FIXING STRUCTURE OF WIRING MEMBER AND WIRING MEMBER

TECHNICAL FIELD

The present disclosure relates to a fixing structure of a wiring member and the wiring member.

BACKGROUND ART

Patent Document 1 discloses a technique of attaching and fixing a wire harness to a molded ceiling by a double-sided adhesive tape.

PRIOR ART DOCUMENTS

Patent Documents

Patent Document 1: Japanese Patent Application Laid-Open No. 2000-264137

SUMMARY

Problem to be Solved by the Invention

In the technique described in Patent Document 1, there is a possibility that adhesion strength between the wire harness and the molded ceiling is insufficient when the wire harness is thick or heavy.

Accordingly, an object is to provide a technique of achieving a firm bonding of an electrical wire bundle to an adherend.

Means to Solve the Problem

A fixing structure of a wiring member according to the present disclosure includes: an electrical wire bundle; an exterior member externally mounted to the electrical wire bundle; and an adherend having a main surface as a flat surface, wherein the exterior member has an outer surface as a flat surface, and the outer surface and the main surface have surface contact with and are bonded to each other while the electrical wire bundle is disposed on the main surface of the adherend.

Effects of the Invention

According to the present disclosure, the electrical wire bundle and the adherend are firmly bonded to each other.

DESCRIPTION OF EMBODIMENT(S)

Description of Embodiment of Present Disclosure

Figure 1:
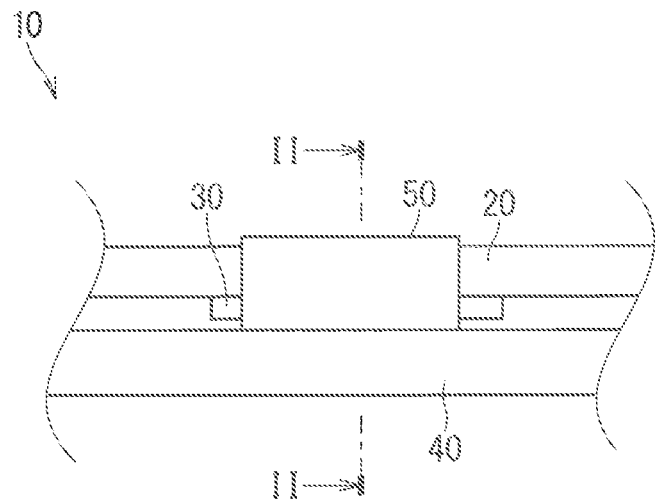
FIG. 1 is a side view illustrating a fixing structure of a wiring member according to an embodiment 1.

Embodiments of the present disclosure are listed and described firstly.

A fixing structure of a wiring member according to the present disclosure is as follows.

(1) A fixing structure of a wiring member includes: an electrical wire bundle; an exterior member externally mounted to the electrical wire bundle; and an adherend having a main surface as a flat surface, wherein the exterior member has an outer surface as a flat surface, and the outer surface and the main surface have surface contact with and are bonded to each other while the electrical wire bundle is disposed on the main surface of the adherend. The outer surface of the exterior member and the main surface of the adherend have surface contact with and are bonded to each other, thus the electrical wire bundle is firmly bonded to the adherend.

(2) The outer surface and the main surface may be bonded to each other via an adhesive member. Accordingly, an appropriate adhesive member is selected in accordance with the outer surface and the main surface, thus the electrical wire bundle is firmly bonded to the adherend. The outer surface and the main surface can be easily bonded to each other.

(3) It is also applicable that the adhesive member includes a welding layer which is melted when heat is applied and cm be bonded, and the welding layer is bonded to at least one of the outer surface and the main surface. Accordingly, the welding layer is melted in a state where the welding layer is located between the adherend and the electrical wire bundle, thus the adherend and the electrical wire bundle can be bonded to each other. Even when the welding layer is exposed in a state before the adherend and the electrical wire bundle are bonded to each other, the welding layer hardly adheres to the other member, and reduction in adhesion force hardly occurs.

(4) The exterior member may be fixed to the electrical wire bundle by the adhesive member wound around the electrical wire bundle and the exterior member. Accordingly, the exterior member is externally mounted easily by the adhesive member.

(5) The exterior member may be fixed to the electrical wire bundle by a banding member provided separately from the adhesive member. Accordingly, a usage amount of the adhesive member can be reduced.

(6) A conductive layer may be provided to be overlapped with the welding layer. The conductive layer is heated by induction heating, thus the welding layer is melted and can be welded to the other side member.

(7) A wiring member according to the present disclosure includes: an electrical wire bundle; an exterior member externally mounted on the electrical wire bundle, and an adhesive member provided on an outer surface of the exterior member, wherein the outer surface is a flat surface, the adhesive member has a welding, layer which can be bonded when heat is applied, and the welding layer is exposed in a position overlapped with the outer surface. Accordingly, the welding layer is melted and the outer surface and the main surface are bonded in a state where the wiring member is disposed on the main surface of the adherend so that the outer surface of the exterior member is overlapped with the main surface of the adherend, thus the electrical wire bundle is firmly bonded to the adherend.

[Details of embodiment of present disclosure] Specific examples of a fixing structure of a wiring member of the present disclosure are described hereinafter with reference to the drawings. The present disclosure is not limited to these examples, but is indicated by claims, and it is intended that meanings equivalent to claims and all modifications within a scope of claims are included.

Figure 2:
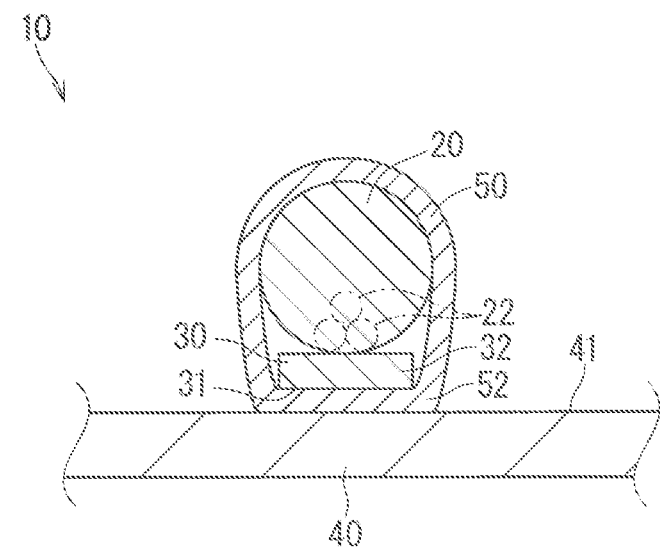
FIG. 2 is a cross-sectional view of the fixing structure cut along a II-II line in FIG. 1.

[Embodiment 1] A fixing structure of a wiring member according to an embodiment 1 is described hereinafter. FIG. 1 is a side view illustrating a fixing structure 10 of the wiring member according to the embodiment 1. FIG. 2 is a cross-sectional view of the fixing structure cut along a II-II line in FIG. 1.

The fixing structure 10 of the wiring member includes an electrical wire bundle 20, an exterior member 30, and an adherend 40. Herein, the fixing structure 10 of the wiring member further includes an adhesive member 50. The electrical wire bundle 20 is fixed to the adherend 40 via the exterior member 30 and the adhesive member 50.

The electrical wire bundle 20 includes a plurality of electrical wires 22. Each electrical wire 22 includes a core wire and a covering layer. The core wire includes one or a plurality of strands. The strand is formed of a conductive material such as copper or aluminum. The covering layer covers the core wire. The covering layer has insulation properties. The covering layer is formed by extrusion molding resin around the core wire or applying an insulating costing around the core wire. The plurality of electrical wires 22 may be bundled by a banding member not shown in the drawings. The electrical wire bundle 20 is bundled to have nearly a round shape in cross section, for example. An adhesive tape or a handing band may be adopted as the banding member.

The exterior member 30 is externally mounted to the electrical wire bundle 20. The exterior member 30 includes an outer surface 31 as a flat surface. The outer surface 31 is a surface facing a side opposite to the electrical wire bundle 20. Herein, the exterior member 30 is a plate-like member covering one side of the electrical wire bundle 20. The exterior member 30 is formed into a flat plate-like shape. That is to say, a surface of the exterior member 30 facing a side of the electrical wire 22 is also a flat surface.

The exterior member 30 may have rigidity so that the flat surface of outer surface 31 is not deformed but can keep the flat surface when the exterior member 30 is externally mounted to the electrical wire bundle 20. When the banding member is wounded around the exterior member 30 and the exterior member 30 is externally mounted to the electrical wire bundle 20, the exterior member 30 may have rigidity to the extent that the flat surface of outer surface 31 is not deformed under stress of winding but can keep the flat surface.

The adherend 40 includes a main surface 41 as a flat surface. A size of the flat surface of tire main surface 41 may be equal to or larger than the flat surface of the outer surface 31. Herein, the size of the flat surface of the main surface 41 is larger than the flat surface of the outer surface 31 in both a longitudinal direction and a width direction. The adherend 40 is a member provided in a vehicle. The adherend 40 may be an interior member such as a roof trim or a door trim. The adherend 40 may be a body part constituting a framework of a vehicle body. The adherend 40 may be a body panel such as a roof panel or a door panel. The main surface 41 may be made of resin or metal.

The outer surface 31 and the main surface 41 have surface contact with and are bonded to each other in a state where the electrical wire bundle 20 is disposed on the main surface 41 of the adherend 40. Herein, the outer surface 31 and the main surface 41 are bonded to each other via the adhesive member 50.

The adhesive member 50 includes a welding layer 52. When heat is applied to the welding layer 52, the welding layer 52 is melted and can be welded. The welding layer 52 is bonded to at least one of the outer surface 31 and the main surface 41. The welding layer 52 is formed of a material in accordance with a material of the outer surface 31 and a material of the main surface 41 to which the welding layer 52 is bonded. The welding layer 52 is formed of thermoplastic resin, for example, as a material.

When the welding layer 52 is bonded to both the outer surface 31 and the main surface 41, surfaces on both sides of the adhesive member 50 may be the welding layer 52. In this case, the adhesive member 50 may have a single layered structure of only one welding layer 52. One welding layer 52 may be able to be bonded to both the outer surface 31 and the main surface 41. The adhesive member 50 may have a double layered structure made up of a first welding layer suitable for welding to the outer surface 31 and a second welding layer suitable for welding to the main surface 41. The adhesive member 50 may have a multilayered structure made up of three or more layers in which the other layer is provided between the welding layers on the surfaces on the both sides. In a case of the multilayered structure made up of three or more layers, the welding layers on the surfaces on the both sides may be made up of the same material, or may also be made up of different materials such as the first and second welding layers described above.

Needless to say, one of the surfaces of the adhesive member 50 may be a layer other than the welding layer 52. For example, it is also applicable that one surface of the adhesive member 50 is the welding layer 52 and the other surface is an adhesive layer. In this case, it is also applicable that one surface as the welding layer 52 is bonded to the adherend 40 and the other surface as the adhesive layer is bonded to the exterior member 30. It is also applicable that one surface as the welding layer 52 is bonded to the exterior member 30 and the other surface as the adhesive layer is bonded to the adherend 40. In a state where the other surface as the adhesive layer is bonded to one of the exterior member 30 and the adherend 40 firstly, one surface as the welding layer 52 may be bonded to the other one of the exterior member 30 and the adherend 40.

Herein, the adhesive member 50 also has a function of fixing the exterior member 30 to the electrical wire bundle 20. Specifically, the adhesive member 50 is wound around the electrical wire bundle 20 and the exterior member 30. Then, the adhesive member 50 is bonded around the electrical wire bundle 20 and the exterior member 30. Accordingly, the adhesive member 50 fixes the exterior member 30 to the electrical wire bundle 20. That is to say, the exterior member 30 is fixed to the electrical wire bundle 20 by the adhesive member 50 wound around the electrical wire bundle 20 and the exterior member 30.

Herein, the exterior member 30 is a conductive layer 32 that overlaps the welding layer 52. Herein, the exterior member 30 is a conductive plate, and the whole exterior member 30 is the conductive layer 32. A conductive material constituting the conductive layer 32 is not particularly limited, however, applicable is a material easily heated by induction heating such as metal (aluminum, copper, iron, or alloy thereof), for example. The exterior member 30 may also include a non-conductive layer. For example, the exterior member 30 may also include a resin plate as a non-conducive layer and a conductive foil as a conductive layer joined to a surface of the resin plate.

The conductive layer 32 may not be provided on the exterior member 30. The conductive layer 32 may be provided on the adherend 40 or the adhesive member 50, for example. The conductive layer 32 may be provided on at least one of the exterior member 30, the adhesive member 50, and the adherend 40.

<Wiring Member>

Figure 3:
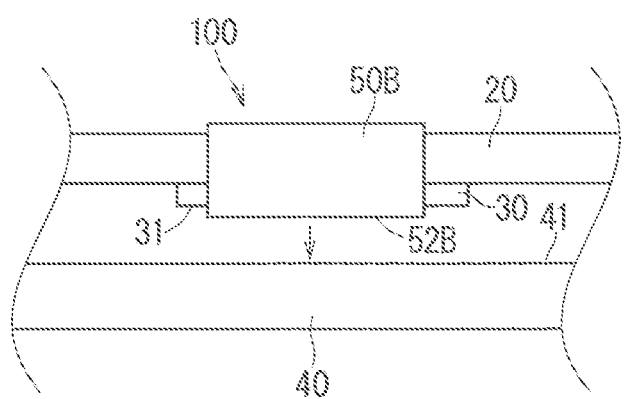
FIG. 3 is an explanation diagram illustrating a wiring member fixed to an adherend.

FIG. 3 is an explanation diagram illustrating a wiring member 100 fixed to the adherend 40.

The fixing structure 10 of the wiring member described above is formed by fixing the wiring member 100 to the adherend 40, for example. The wiring member 100 includes the electrical wire bundle 20 and the exterior member 30 described above. The exterior member 30 is externally mounted to the electrical wire bundle 20 also in the wiring member 100.

The wiring member 100 further includes an adhesive member 50B. The adhesive member 50B is the adhesive member 50 described above in a state before being bonded to the adherend 40. The adhesive member 50B is provided on the outer surface 31 of the exterior member 30. The adhesive member 50B includes a welding layer 52B. When heat is applied to the welding layer 52B, the welding layer 52B is melted and can be welded. The welding layer 52B is the welding layer 52 described above in a state before being bonded to the adherend 40. In the wiring member 100, the welding layer 52B is exposed in a position overlapped with the outer surface 31.

In the wiring member 100, the adhesive member 50B may be or may not be bonded to the exterior member 30 and the electrical wire bundle 20. When the adhesive member 50B is bonded to the exterior member 30 and the electrical wire bundle 20 in the wiring member 100, the adhesive member 50B may also have a function of fixing the exterior member 30 to the electrical wire bundle 20. Specifically, the adhesive member 50B is wound around the electrical wire bundle 20 and the exterior member 30. Then, the adhesive member 50B is bonded around the electrical wire bundle 20 and the exterior member 30. Accordingly, the adhesive member 50B fixes the exterior member 30 to the electrical wire bundle 20. That is to say, the exterior member 30 is fixed to the electrical wire bundle 20 by the adhesive member 50 wound around the electrical wire bundle 20 and the exterior member 30. At this time, it is applicable that the adhesive member 50B is bonded to the exterior member 30 and the electrical wire bundle 20 by the welding layer 52B, or bonded to the exterior member 30 and the electrical wire bundle 20 by an adhesive layer provided separately from the welding layer 52B. When the adhesive member 50B is not bonded to the exterior member 30 and the electrical wire bundle 20 in the wiring member 100, the adhesive member 50B may be positioned and fixed to the outer surface 31 of the exterior member 30 by the other member. For example, it is also applicable that a banding member not shown in the drawings is wound around the adhesive member 50B, the exterior member 30, and the electrical wire bundle 20, thus the adhesive member 50B is positioned and fixed to the outer surface 31 of the exterior member 30.

As illustrated in FIG. 3, the wiring member 100 is disposed on the main surface 41 of the adherend 40 so that the outer surface 31 of the exterior member 30 is overlapped with the main surface 41 of the adherend 40. In this state, the welding layer 52B is melted by heating, and bonded to the main surface 41. Accordingly, the outer surface 31 and the main surface 41 have surface contact with and are bonded to each other via the adhesive member 50, thus the electrical wire bundle 20 is firmly bonded to the adherend 40.

When the conductive layer 32 is provided, induction heating can be adopted as a means of heating the welding layer 52B. That is to say, alternating current flows in a conductive wire routed near the conductive layer 32. Current (eddy current) flows in the conductive layer 32 in accordance with a change of electrical field occurring at this time, and the conductive layer 32 generates heat by Joule heat caused by the current. The welding layer 52B is heated by this heat and melted.

Effect Etc. of Embodiment 1

According to the fixing structure 10 of the wiring member having the above configuration, the outer surface 31 of the exterior member 30 and the main surface 41 of the adherend 40 have surface contact with and are bonded to each other, thus the electrical wire bundle 20 is firmly bonded to the adherend 40.

The adhesive member 50 is provided, thus when the appropriate adhesive member 50 is selected in accordance with the outer surface 31 and the main surface 41, the electrical wire bundle 20 is firmly bonded to the adherend 40. The outer surface 31 and the main surface 41 are easily bonded.

The welding layer 52 is provided, thus when the welding layer 52 is melt in the state where the welding layer 52 is located between the adherend 40 and the electrical wire bundle 20, the adherend 40 and the electrical wire bundle 20 can be bonded to each other. Even when the welding layer 52 is exposed in the state before the adherend 40 and the electrical wire bundle 20 are bonded to each other, the welding layer 52 hardly adheres to the other member, and reduction in adhesion force hardly occurs. The welding layer 52 is provided, thus the welding layer 52 can be melted and fixed after the electrical wire bundle 20 and the adherend 40 are positioned. Thus, the electrical wire bundle 20 and the adherend 40 are easily fixed in an appropriate position.

The adhesive member 50 fixes the exterior member 30 to the electrical wire bundle 20, thus the exterior member 30 is externally mounted to the electrical wire bundle 20 easily by the adhesive member 50. A member for fixing the exterior member 30 to the electrical wire bundle 20 needs not be provided separately.

The conductive layer 32 is provided to be overlapped with the welding layer 52. The conductive layer 32 is heated by induction heating, thus the welding layer 52 is melted and can be welded to the other side member.

The wiring member 100 described above is used in forming, the fixing structure 10 of the wiring member. The welding layer 52B is melted and the outer surface 31 and the main surface 41 are bonded in a state where the wiring member 100 is disposed on the main surface 41 of the adherend 40 so that the outer surface 31 of the exterior member 30 is overlapped with the main surface 41 of the adherend 40, thus the electrical wire bundle 20 is firmly bonded to the adherend 40.

Figure 4:
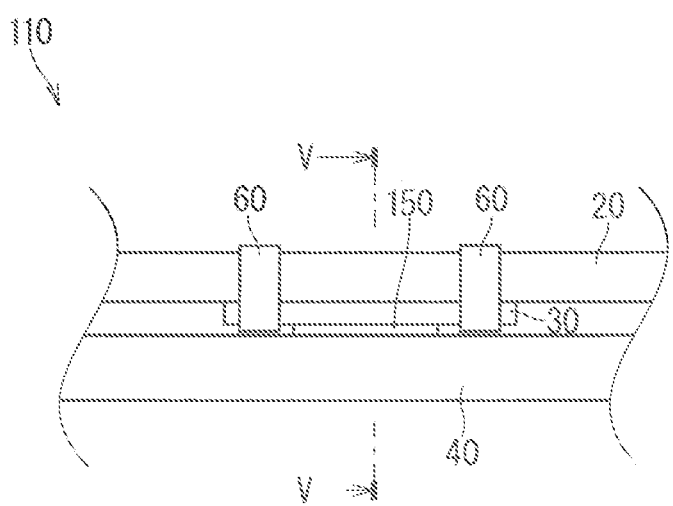
FIG. 4 is a side view illustrating a fixing structure of a wiring member according to an embodiment 2.
Figure 5:
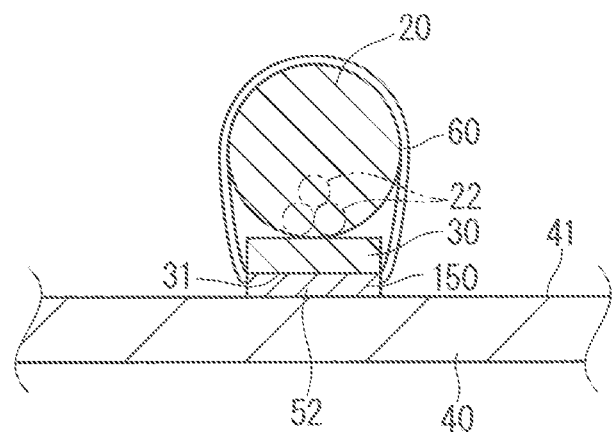
FIG. 5 is a cross-sectional view of the fixing structure cut along a V-V line in FIG. 4.

[Embodiment 2] A fixing structure of a wiring member according to an embodiment 2 is described. FIG. 4 is a side view illustrating a fixing structure 110 of the wiring member according to the embodiment 2. FIG. 5 is a cross-sectional view of the fixing structure cut along a V-V line in FIG. 4. In the following description of the present embodiment, the same reference numerals are assigned to the similar constituent elements described above, and the description thereof will be omitted.

The fixing structure 110 of the wiring member is different from the fixing structure 10 of the wiring member described above in that the fixing structure 110 further includes a banding member 60. A region where an adhesive member 150 is provided in the fixing structure 110 of the wiring member is different from a region where the adhesive member 50 is provided in the fixing structure 10 of the wiring member described above.

Specifically, the banding member 60 is provided separately from the adhesive member 150. The banding member 60 is wound around the electrical wire bundle 20 and the exterior member 30 to fix the exterior member 30 to the electrical wire bundle 20. That is to say, the exterior member 30 is fixed to the electrical wire bundle 20 by the handing member 60 provided separately from the adhesive member 150. An adhesive tape or a banding band may be adopted as the handing member 60. The handing member 60 may also have a function of bundling the plurality of electrical wires 22 to constitute the electrical wire bundle 20. That is to say, in a part where the banding member 60 is provided, the banding member bundling the plurality of electrical wires 22 to constitute the electrical wire bundle 20 may be or may not be provided separately from the banding member 60.

In the example illustrated in FIG. 4, the banding member 60 is wound at a plurality of positions (both end portions herein) at intervals in the exterior member 30 along a longitudinal direction of the electrical wire bundle 20. A position where the banding member 60 is wound and the number of positions are not limited thereto. For example, the banding member 60 may be wound at only one position in an intermediate part of the exterior member 30 along the longitudinal direction of the electrical wire bundle 20.

The adhesive member 150 is not wound around the electrical wire bundle 20 and the exterior member 30. The adhesive member 150 does not fix the exterior member 30 to the electrical wire bundle 20. The adhesive member 150 is provided to extend over the main surface 41, thus is not provided separately from the main surface 41. The adhesive member 150 is provided only between the outer surface 31 and the main surface 41. A usage amount of the adhesive member 150 is reduced to a lower level than a case where the adhesive member is wound around the electrical wire bundle 20 and the exterior member 30 as with the adhesive member 50 described above.

Herein, the adhesive members 50 and 150 having the welding layer 52 are generally more expensive than a general adhesive tape in many cases. The usage amount of the adhesive member 150 is reduced to a low level as with the present example, thus a material cost in a manufacturing cost is reduced.

In the example illustrated in FIG. 4, the ban ins member 60 is not wound around the adhesive member 150. The handing member 60 is wound at a position separately from the adhesive member 150. The banding member 60 may also be wound around the adhesive member 150.

Figure 6:
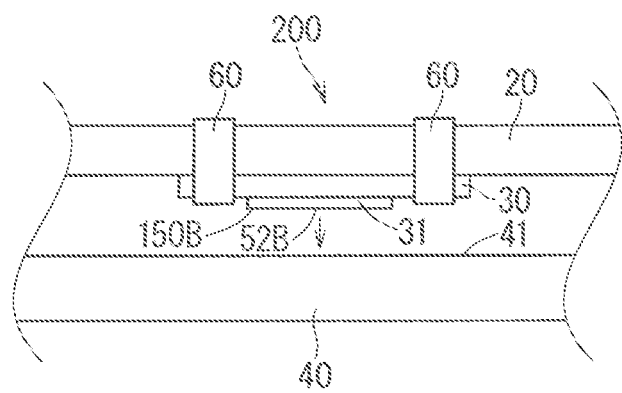
FIG. 6 is an explanation diagram illustrating the wiring member fixed to the adherend.

The fixing structure 110 of the wiring member in the present example is also formed by fixing the wiring member 200 to the adherend 40 as with an example in FIG. 6. The exterior member 30 is externally mounted to the electrical wire bundle 20 by the banding member 60 in the win member 200. The adhesive member 150B in the wiring member 200 is bonded to the exterior member 30. An outer surface of the welding layer 52B the adhesive member 150B may protrude to the same extent as an outer surface of the banding member 60, or may also protrude to an outer side than the outer surface of the banding member 60. Accordingly, the outer surface of the welding layer 52B has contact with the main surface 41 easily. For example, in the example illustrated in FIG. 6, a part of the outer surface 31 of the exterior member 30 where the banding member 60 is provided and a part thereof where the adhesive, member 150B is provided are flush with each other. In this ease, a thickness of the adhesive member 150B is equal to or larger than that of the banding member 60, thus the outer surface of the welding layer 52B can protrude to the same extent as an outer surface of the banding member 60, or protrude to the outer side than the outer surface of the banding member 60. In a case where the welding layer 52B is melted and welded to the main surface 41 to constitute the welding layer 52, when the wiring member 200 and the adherend 40 are pressed against each other, the thickness of the welding layer 52 is also considered to be smaller than that of the welding layer 52B.

The adhesive member 150B in the wiring member 200 may not be bonded to the exterior member 30. In this case, the banding member 60 may be wound around the adhesive member 150B. Accordingly, the adhesive member 150B is easily fixed to the exterior member 30.

Modification Example

In each embodiment, the outer surface 31 and the main surface 41 are bonded to each other via the adhesive members 50 and 150, however, this configuration is not necessary. The outer surface 31 and the main surface 41 may be directly bonded to each other without intervention of the adhesive members 50 and 150. In this ease, at least one of the outer surface 31 and the main surface 41 may be formed of a material such as thermoplastic resin which is melted by heat and can be bonded to the other side member. The outer surface 31 and the main surface 41 may be formed of the same type of thermoplastic resin as a material.

In the description of each embodiment, the adhesive member includes the welding layer however, this configuration is not necessary. The adhesive member may not include the welding layer. For example, both side surfaces of the adhesive member may be an adhesive layer. In this case, the adhesive member provided with a piece of release paper may be previously bonded to one of the wiring member 100 and the adherend 40. Then, the adhesive member from which the piece of release paper is removed is bonded to the other one of the wiring member 100 and the adherend 40. The adhesive member may include a bonding layer formed of a moisture-curable adhesive agent, a two-component curable adhesive agent, an ultraviolet curable adhesive agent, or a thermal curable adhesive agent, for example. In this case, when the electrical wire bundle 20 provided with the exterior member 30 is disposed on the adherend 40, the various type of adhesive agent described above which has not been cured yet but can be bonded may be provided between the exterior member 30 and the adherend 40.

In the above description, when the adhesive member includes the welding layer, the conductive layer 32 is provided to be overlapped with the welding layer, however, this configuration is not necessary. The conductive layer 32 may be omitted. In this case, for example, the welding layer may be melted by a means such as hot-air heating or laser heating, for example, other than induction heating using the conductive layer 32.

In the above description, the adhesive members 50B and 150B are provided on the wiring members 100 and 200, however, this configuration is not necessary. The adhesive members 50B and 150B may be provided on the adherend 40. In this case, when the electrical wire bundle 20 provided the exterior member 30 is disposed on the adherend 40, the adhesive members 50B and 150B may be heated and bonded to the exterior member 30 in a state where the exterior member 30 is located on the adhesive members 50 and 150B.

The exterior member 30 may be provided in a plurality of positions at intervals along the longitudinal direction of the electrical wire bundle 20. This plurality of exterior members 30 may be bonded to one adherend 40. The plurality of exterior members 30 may be bonded to one flat surface in the main surface 41 of the adherend 40.

The exterior member 30 described above is the flat plate whose both surfaces are flat, however, the size of the exterior member 30 is not limited thereto. The surface of the exterior member facing the side of the electrical wire 22 may have a curved surface in accordance with an outer peripheral surface of the electrical wire bundle 20 along a circumferential direction of the electrical wire bundle 20. For example, the exterior member may be formed into an L-like shape to cover two sides of the electrical wire bundle 20. For example, the exterior member may be formed into a gutter-like shape to cover three sides of the electrical wire bundle 20. For example, the exterior member may be formed into a cylindrical shape to cover four sides of the electrical wire bundle 20. When the exterior member is formed into the L-like shape, the gutter-like shape, or the cylindrical shape, the exterior member is considered to have a first wall and a second wall intersecting with each other. These first wall and second wall may be connected to be hardly bended, that is to say, they may be connected to have rigidity to be able to keep a state where the first wall and the second wall intersect with each other. The first wall and the second wall may be connected to be easily bended, that is to say, they may be connected to have rigidity to hardly keep a state where the first wall and the second wall intersect with each other. In the latter case, the first wall and the second wall may keep the intersecting state by attaching the exterior member to the electrical wire bundle 20 by the handing member 60, for example.

The configurations described in the embodiments and modification examples thereof can be appropriately combined as long as they are not contradictory.

EXPLANATION OF REFERENCE SIGNS 10, 110 fixing structure of wiring member
20 electrical wire bundle
22 electrical wire
30 exterior member
31 outer surface
32 conductive layer
40 adherend
41 main surface
50, 50B, 150, 150B adhesive member
52, 52B welding layer
60 banding member
100, 200 wiring member

The invention claimed is:

1. A fixing structure of a wiring member, comprising:
an electrical wire bundle;
an exterior member mounted on a portion of the outer periphery of the electrical wire bundle via an adhesive member that fixes the exterior member to the electrical wire bundle; and
an adherend having a main surface as a flat surface, wherein
the exterior member has an outer surface as a flat surface, and
wherein the outer surface of the exterior member and the main surface of the adherend are bonded to each other via the adhesive member while the electrical wire bundle is disposed on the main surface of the adherend,
wherein the adhesive member includes a welding layer that is melted and bonded to at least one of the outer surface of the exterior member and the main surface of the adherend, and
wherein the adhesive member is wound around the electrical wire bundle and the exterior member to fix the exterior member to the electrical wire bundle without being interposed between the exterior member and the electrical wire bundle.

2. The fixing structure of the wiring member according to claim 1, wherein
the adhesive member includes a welding layer that is melted and bonded to at least one of the outer surface of the exterior member and the main surface of the adherend.

3. The fixing structure of the wiring member according to claim 2, wherein the exterior member includes a conductive layer that overlaps the welding layer.

4. A wiring member, comprising:
an electrical wire bundle;
an exterior member mounted on a portion of the outer periphery of the electrical wire bundle via an adhesive member that fixes the exterior member to the electrical wire bundle; and
the adhesive member provided on an outer surface of the exterior member, wherein the outer surface is a flat surface,
the adhesive member has a welding layer that is configured to be melted so as to bond the wiring member to a surface of an adherend, wherein
the adhesive member is wound around the electrical wire bundle and the exterior member to fix the exterior member to the electrical wire bundle without being interposed between the exterior member and the electrical wire bundle, and
the welding layer is exposed in a position overlapped with the outer surface of the exterior member.

* * * * *